Dec. 7, 1926.
W. SENEZ
1,609,777
CHALK LINE AND PLUMB BOB
Filed March 12, 1926
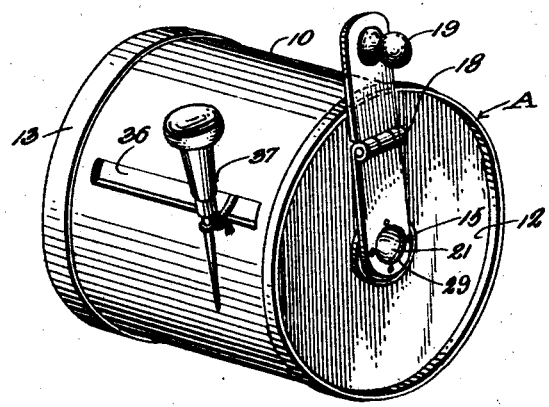
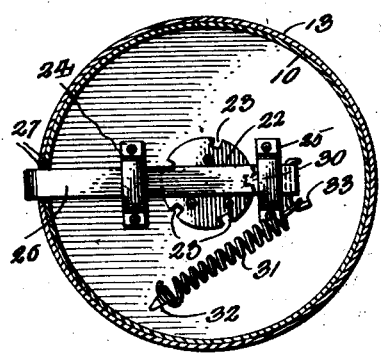
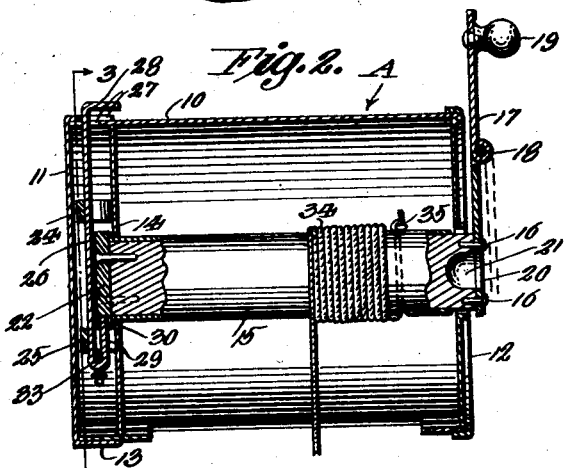
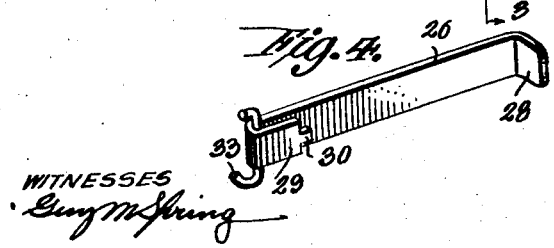
WITNESSES
Inventor
WILLIAM SENEZ
By Richard B. Owen, Attorney Patented Dec. 7, 1926.

1,609,777

UNITED STATES PATENT OFFICE.

WILLIAM SENEZ, OF NEW BEDFORD, MASSACHUSETTS.

CHALK LINE AND PLUMB BOB.

Application filed March 12, 1926. Serial No. 94,296.

This invention appertains to new and useful improvements in chalk lines and plumb bobs employed in the construction of buildings generally and has for its primary object the provision of such a device which is simple in construction, convenient to handle and easy to operate.

Another object of the present invention is the provision of such a device including a rotatable shaft carrying the chalk line or plumb bob together with new and novel means for automatically locking the shaft to prevent the rotation thereof.

Another object of the present invention is to provide such a devices having incorporated therewith simplified means for unlocking the shaft when it is desired to rotate the same to wind up the chalk line or plumb bob.

A further object of the present invention is the provision of such a device which while simple in construction, is nevertheless strong, sturdy and durable, practical and efficient in its operation and well designed for the purposes for which it is intended.

With these and numerous objects in view, the invention resides in the novel construction, combination and arrangement of parts to be more fully hereinafter described, illustrated in the accompanying drawings and particularly pointed out in the appended claims.

In the drawings forming a part of this application and wherein like characters of reference denote corresponding parts throughout the several views:

Figure 1 is a perspective view of a chalk line and plumb bob constructed in accordance with the present invention.

Figure 2 is a central sectional view taken longitudinally through the same.

Figure 3 is a transverse sectional view on line 3—3 of Figure 2, looking in the direction of the arrows.

Figure 4 is a detail perspective view of the locking plate.

Referring more particularly to the accompanying drawings wherein for the purpose of illustration has been disclosed a preferred embodiment of the present invention, the letter A generally represents a cylindrical casing or housing including a drum 10 provided with the end walls 11 and 12, the end wall 11 being provided with a substantially wide peripheral flange 13 and being detachably fitted onto the drum 10 for a purpose to be more fully set forth hereinafter.

Secured within the drum 10 slightly inwardly of the removable end wall 11 is a false end or partition wall 14 and journaled within the partition wall 14 and the end wall 12 is a shaft 15, said shaft extending slightly beyond the end wall 12 and having secured thereto as at 16, an operating handle 17, said handle being hingedly connected intermediate its ends as at 18 so that the same is capable of being folded.

Carried by the outer free end of the operating handle 17 is a knob 19 and when the handle is folded as shown by the dotted lines in Figure 2, the said knob 19 is adapted to pass through the opening 20 in the inner end of the handle and to be frictionally engaged and held within the opening 21 in the end of the shaft 15.

The opposite end of the shaft 15 projects slightly beyond the partition wall 14 and has secured to the end surface thereof a disk 22 provided with a plurality of spaced peripheral notches 23. Secured to the outer surface of the partition wall 14 at opposite sides of the notched disk 22 are the oppositely disposed guide members 24 and 25 within which is slidably arranged the elongated locking plate 26, said plate being positioned directly in front of the notched disk 22 and extending outwardly beyond the casing A through the alined notches 27 cut in the peripheral edges of the drum 10 and flange 13 of the removable end wall 11. The outer end of the locking plate 26 is laterally directed to provide a finger engaging portion 28 while the inner end of the said locking plate is bent or turned under upon itself as indicated at 29, the turned under portion 29 being reduced to provide the terminal lug 30 which is adapted for selective engagement with the notches 23 in the disk 22.

For the purpose of normally urging the locking plate 26 outwardly and to retain the lug 30 in engagement with one of the notches 23 in the disk 22, there is provided a contractile coil spring 31, one end thereof being secured to the hook 32 carried by the partition wall 14 while the other or opposite end thereof is secured to one end of the substantially U-shaped pin 33 rigidly secured between the inner end of the locking plate and the turned-under portion 29 thereof.

Wound upon the shaft 15 is the cord or other suitable flexible element 34, one end thereof being secured as at 35 to the said shaft while the other end thereof extends through the elongated opening 36 in the drum 10. The cord 34 serves either as a chalk line or a plumb bob and may have secured to the outer free end thereof a chalk line securing pin 37 or any desired type of plumb.

From the above, it will thus be seen that the spring 31 serves to normally retain the lug 30 in engagement with one of the notches 23 in the disk 22 whereby to prevent the rotation of the shaft 15 and the unwinding of the cord 34. When it is desired to either wind or unwind the cord 34, it is necessary that the operator press upon the finger engaging portion 28 so as to force the locking plate 26 inwardly against the action of the spring 31 thereby disengaging the lug 30 from the notched disk 22. The operator can then by simply grasping the operating handle 17 wind or unwind the cord and as soon as he releases the pressure from the finger engaging portion 28, the action of the spring 31 will urge the locking plate outwardly to engage the lug 30 with the notched disk 22. When the device is not in use, the handle 17 may be folded as described hereinabove so that the same will be out of the way and not as susceptible to injury as would be the case were it unfolded. The end wall 11 is detachably secured to the drum 10 in order that it may be removed should it be desired to have access to the operating means for any purpose such as the making of repairs thereto.

From the above, it will be appreciated that there has been provided a novel and simplified device which will accomplish all of the objects and perform all of the functions claimed and it is to be understood that the changes in the details of construction in the present invention may be resorted to without departing from or sacrificing the spirit of the invention so long as such changes fall within the scope of the appended claims.

What is claimed is:

1. In a device of the class described, a drum having end walls and a partition wall, the end wall adjacent the partition wall being removable, a shaft rotatably mounted within the partition wall and the remote end wall, a notched disk carried by one end of the shaft between the partition wall and the removable end wall, guide members secured to the partition wall, and a locking plate slidably mounted within the guide members, the inner end portion of the said plate being turned under upon itself and provided with a terminal lug adapted for engagement with the notched disk.

2. In a device of the class described, a drum provided with end walls and a partition wall arranged parallel with the said end walls, the end wall adjacent the partition wall being removable, a shaft rotatably mounted within the partition wall and the remote end wall and having a line secured thereto, a notched disk carried by one end of the shaft and positioned between the partition wall and the removable end wall, guide members secured to the outer face of the partition wall at opposite sides of said disks, a locking plate slidably mounted within the guide members and projecting beyond the drum, the inner end portion of said plate being turned under upon itself and provided with a terminal reduced lug adapted for engagement with the notched disk, and a spring having one end connected to the locking plate and the opposite end connected to the partition wall, said spring acting to normally urge the locking plate outwardly and the terminal reduced lug thereof into engagement with the said notched disk.

In testimony whereof I affix my signature.

WILLIAM SENEZ